United States Patent
Hotta et al.

(10) Patent No.: US 8,740,246 B2
(45) Date of Patent: Jun. 3, 2014

(54) AIRBAG APPARATUS

(71) Applicant: Toyoda Gosei Co., Ltd., Kiyosu (JP)

(72) Inventors: Masashi Hotta, Kiyosu (JP); Yuji Sato, Kiyosu (JP); Kensaku Honda, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/833,310

(22) Filed: Mar. 15, 2013

(65) Prior Publication Data

US 2013/0341896 A1    Dec. 26, 2013

(30) Foreign Application Priority Data

Jun. 22, 2012   (JP) .................................. 2012-141207

(51) Int. Cl.
  *B60R 21/16* (2006.01)
  *B60R 21/231* (2011.01)
  *B60R 21/233* (2006.01)

(52) U.S. Cl.
  CPC ............ *B60R 21/231* (2013.01); *B60R 21/233* (2013.01)
  USPC ...................................................... 280/742

(58) Field of Classification Search
  CPC ........................... B60R 21/231; B60R 21/233
  USPC ................. 280/729, 730.2, 736, 742
  See application file for complete search history.

(56) References Cited

U.S. PATENT DOCUMENTS

| 5,586,782 | A  | * | 12/1996 | Zimmerman et al. ..... 280/730.2 |
| 6,478,329 | B1 | * | 11/2002 | Yokoyama ................... 280/729 |
| 8,052,168 | B2 | * | 11/2011 | Wipasuramonton et al. ........................ 280/730.2 |
| 2006/0001244 | A1 | * | 1/2006 | Taguchi et al. ............... 280/729 |
| 2007/0138773 | A1 | * | 6/2007 | Song ............................. 280/729 |
| 2012/0025499 | A1 |   | 2/2012 | Shibayama et al. |

FOREIGN PATENT DOCUMENTS

| JP | 2012-030614 A | 2/2012 |
| JP | 2012-046167 A | 3/2012 |

* cited by examiner

*Primary Examiner* — Faye M Fleming
*Assistant Examiner* — Robert A Coker
(74) *Attorney, Agent, or Firm* — Posz Law Group, PLC

(57) ABSTRACT

An inflation portion of an airbag is divided by a partitioning member into an upstream inflation portion and a downstream inflation portion. Part of the partitioning member forms a pair of overlapping portions overlapped with each other in a band-like shape inside the upstream inflation portion. The overlapping portions are joined to each other by a joint portion located at a boundary between the overlapping portions and non-overlapping portions. The partitioning member includes an opening, which is formed by cancelling the joint between the overlapping portions by the joint portion, and a pressure regulating valve, which includes a pair of valve bodies, which sandwiches the opening. Stress relaxation portions are provided at the overlapping portions. The stress relaxation portions relax stress acting on parts of the joint portion that are adjacent to the opening as the pressure regulating valve is opened.

8 Claims, 10 Drawing Sheets

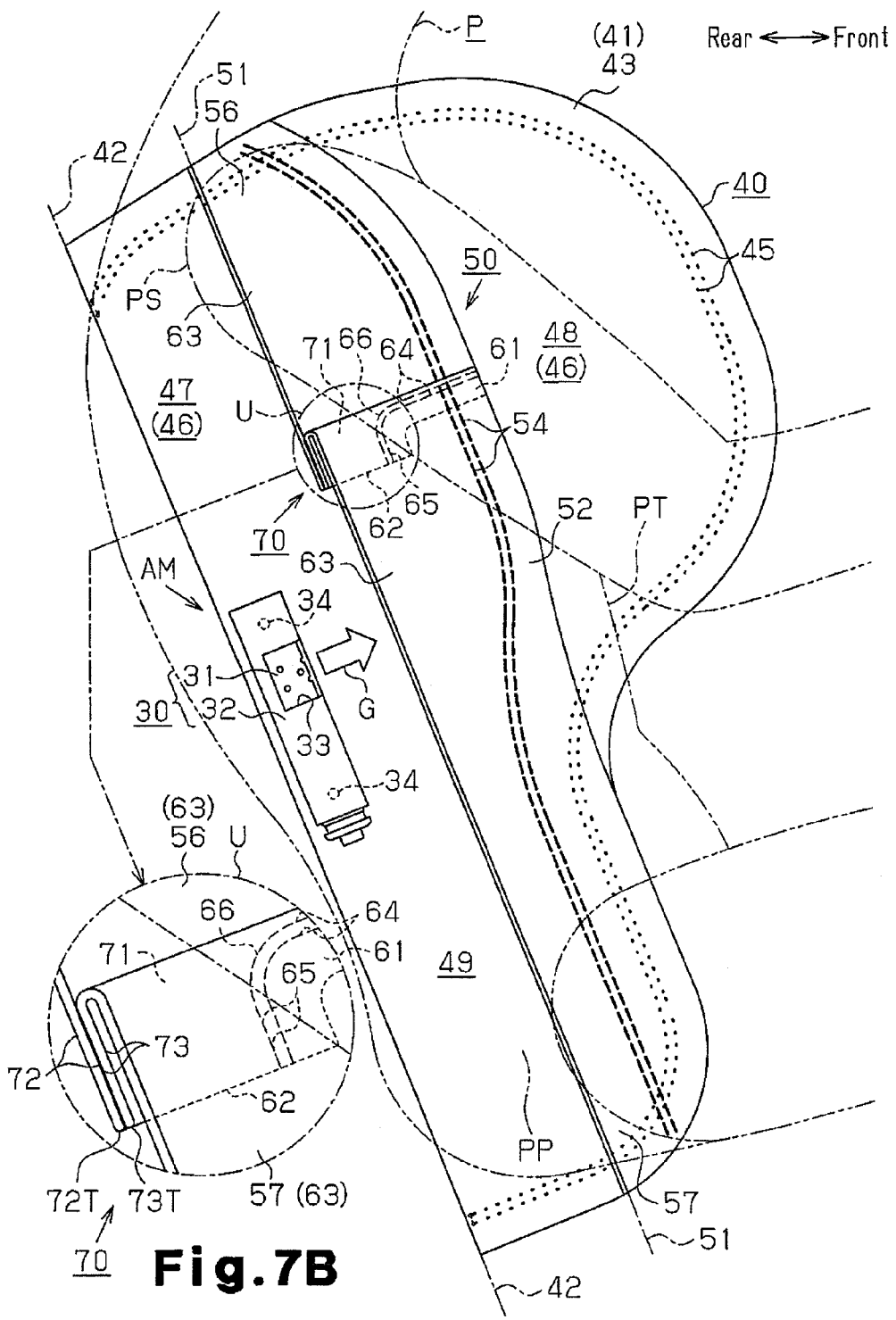

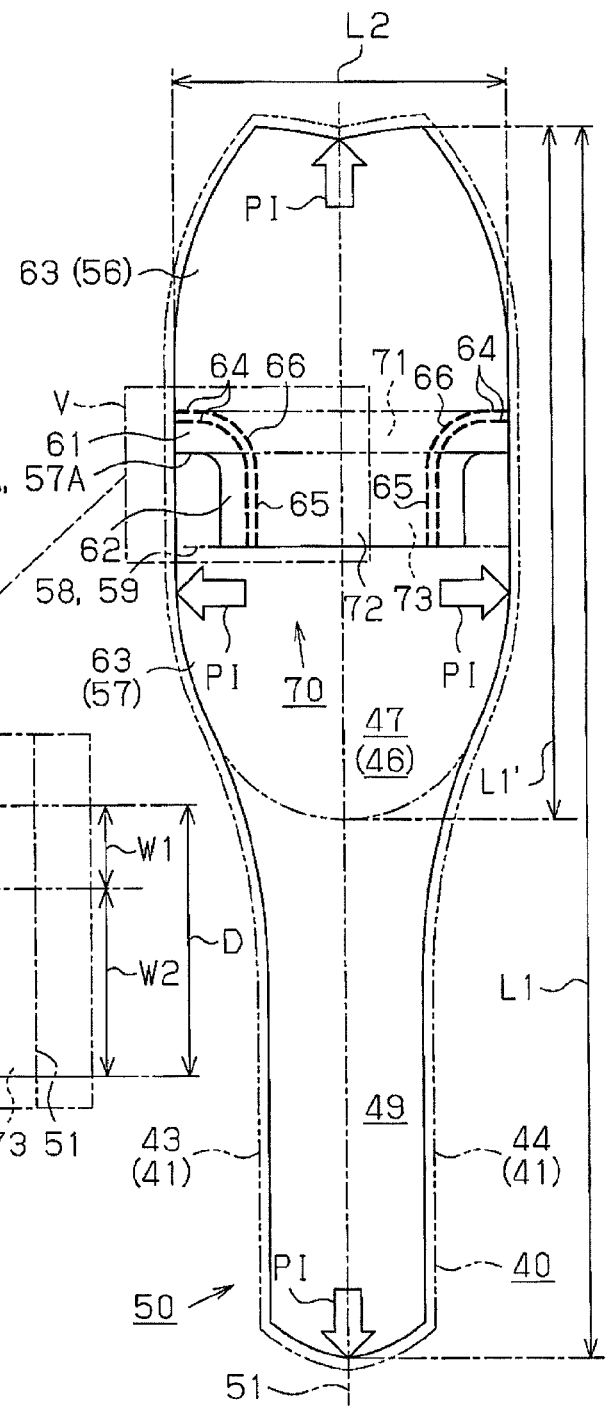
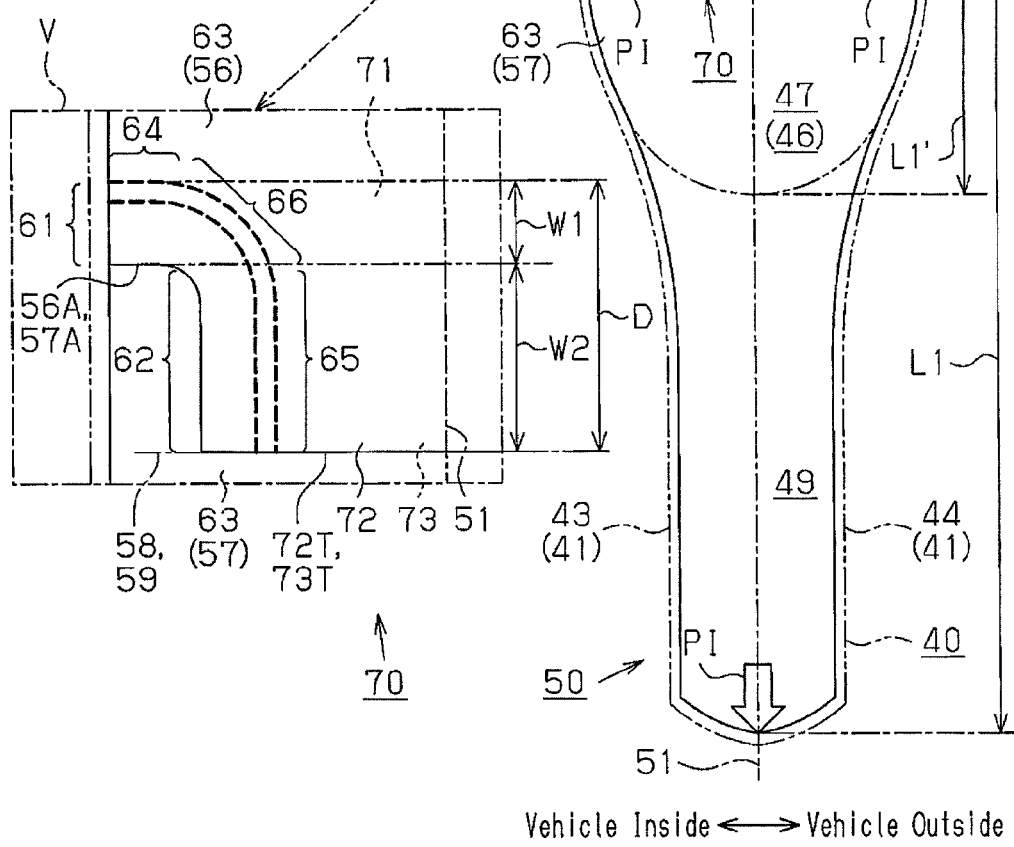

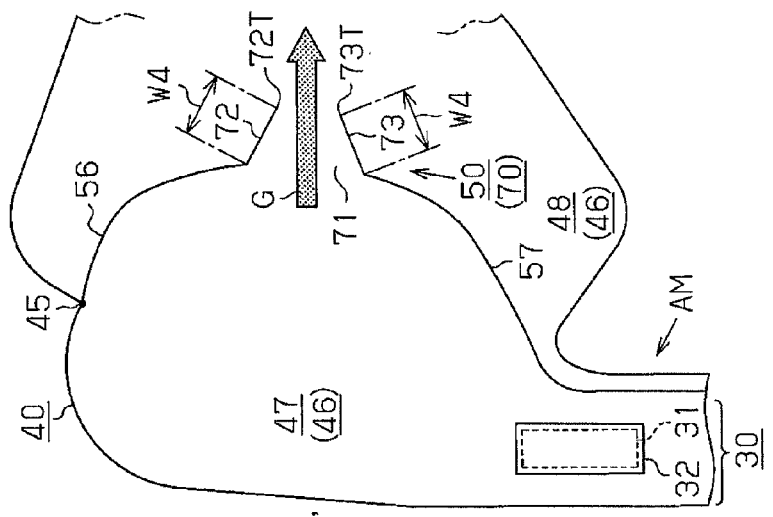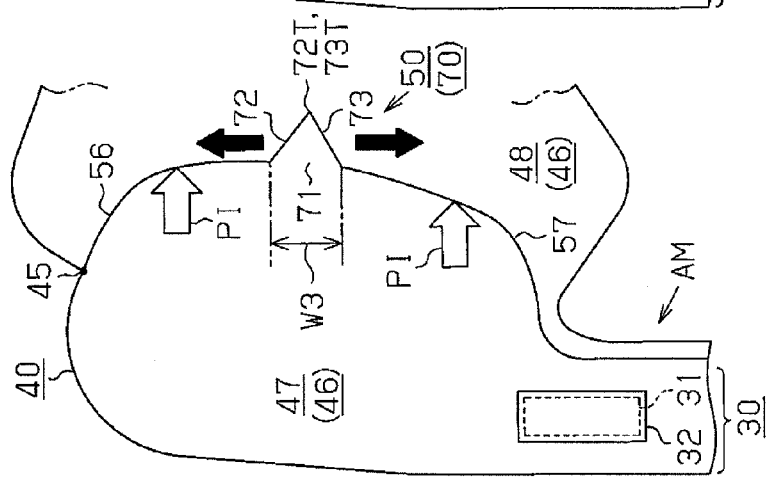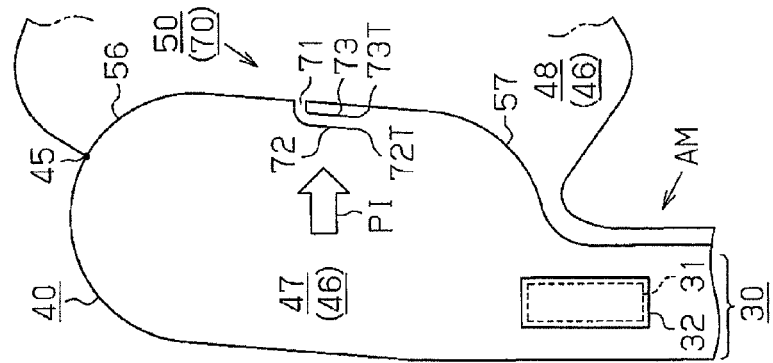

AIRBAG APPARATUS

BACKGROUND OF THE INVENTION

The present invention relates to an airbag apparatus that protects an occupant from an impact by deploying and inflating an airbag at a position close to the occupant seated in a vehicle seat when an impact due to, for example, a collision is applied to a vehicle.

An airbag apparatus is effective for protecting an occupant from an impact when an impact due to, for example, a collision is applied to a vehicle. The airbag apparatus includes an airbag that is formed into a bag shape and an inflator that supplies inflation gas into the airbag.

As a form of the airbag apparatus, a side airbag apparatus that protects an occupant from an impact due to, for example, a side collision has been proposed. In the side airbag apparatus, the airbag is installed in, for example, a backrest of a vehicle seat in a folded state together with an inflator. In the side airbag apparatus, when an impact is applied from the side on a member forming the side portion of a vehicle (body side portion) such as a side door, inflation gas is supplied from the inflator into the airbag. The inflation gas deploys and inflates the airbag, and a portion of the airbag is projected from the vehicle seat with a portion of the airbag remaining in the backrest. The airbag is then deployed and inflated forward of the vehicle from the backrest in a narrow space between the occupant seated in the vehicle seat and the body side portion. The deployed and inflated airbag is located between the occupant and the body side portion that bulges inward to restrain the occupant, and reduces the impact from the side transmitted to the occupant via the body side portion.

As forms of the above-mentioned side airbag apparatus, various apparatuses having a function to adjust the internal pressure of the airbag have been proposed.

For example, a side airbag apparatus disclosed in Japanese Laid-Open Patent Publication No. 2012-46167 includes an airbag 101 that is inflated by inflation gas as shown in FIG. 14. The inflation portion of the airbag 101 is divided by a partitioning member 102 into an upstream inflation portion 103, to which the inflation gas from the inflator is supplied, and a downstream inflation portion 104, to which the inflation gas is supplied via the upstream inflation portion 103.

Part of the partitioning member 102 forms a pair of overlapping portions 105, which overlaps each other in a band-like shape, in the upstream inflation portion 103. The overlapping portions 105 are joined by a joint portion 107 at a boundary between the overlapping portions 105 and non-overlapping portions 106 that are not overlapped.

The partitioning member 102 includes an opening 108, which is formed when the joint of the overlapping portions 105 by the joint portion 107 is partially cancelled, and a pressure regulating valve 110, which includes a pair of valve bodies 109 that sandwich the opening 108.

Before the upstream inflation portion 103 restrains the occupant, the pressure regulating valve 110 is closed by the valve bodies 109 that are pushed against each other in the upstream inflation portion 103 by the inflation gas. Thus, the internal pressure of only the upstream inflation portion 103 of the inflation portion is increased, and the upstream inflation portion 103 is deployed and inflated.

Also, when the upstream inflation portion 103 restrains the occupant, external force generated by the restraint flexes the valve bodies 109 via the partitioning member 102 and partially separates the valve bodies 109 from each other, so that the pressure regulating valve 110 is opened. The opening of the pressure regulating valve 110 causes the inflation gas in the upstream inflation portion 103 to flow out into the downstream inflation portion 104 via the opening 108. Accordingly, the internal pressure of the downstream inflation portion 104 is increased as the internal pressure of the upstream inflation portion 103 is reduced, and the downstream inflation portion 104 is deployed and inflated.

Thus, the above-mentioned operation of the pressure regulating valve 110 causes the property of load applied to the occupant via the airbag 101 to become suitable for appropriately restraining and protecting the occupant. That is, the property of load reaches a predetermined value in a short period of time and is subsequently maintained at the predetermined value.

SUMMARY OF THE INVENTION

In the above-mentioned side airbag apparatus, when the valve bodies 109 flex via the partitioning member 102 and separate from each other, that is, when the pressure regulating valve 110 is opened, stress acts on the joint portion 107, which joins the overlapping portions 105 with each other at a boundary between the overlapping portions 105 and the non-overlapping portions 106. Particularly, a great stress acts on the parts of the joint portion 107 that are adjacent to the opening 108.

In particular, in the airbag apparatus, parts of the joint portion 107 adjacent to the opening 108 extend straight. Thus, the stress associated with the valve opening is likely to concentrate at end portions 111 of the joint portion 107 near the opening 108, and the end portions 111 is likely to be damaged.

Such a problem is not limited to the above-mentioned side airbag apparatus, but can commonly occur in the airbag apparatuses including the regulation valve with the above-mentioned structure.

Accordingly, it is an objective of the present invention to provide an airbag apparatus that prevents parts of joint portions adjacent to an opening from being damaged by stress applied in accordance with opening of a pressure regulating valve.

To achieve the foregoing objective and in accordance with a first aspect of the present invention, an airbag apparatus that includes an airbag and a partitioning member is provided. The airbag has an inflation portion that is deployed and inflated by inflation gas supplied in response to an impact to a vehicle. The partitioning member is arranged in the inflation portion. The partitioning member divides at least part of the inflation portion into an upstream inflation portion, to which the inflation gas is supplied, and a downstream inflation portion, to which the inflation gas is supplied via the upstream inflation portion. The partitioning member includes a pair of overlapping portions and a pair of non-overlapping portion each being continuous with one of the overlapping portions. In the upstream inflation portion, the overlapping portions are overlapped with each other in a band-like shape and joined to each other by a joint portion located at the boundary between the overlapping portions and the non-overlapping portions. The partitioning member further includes an opening that is formed when the joint of the overlapping portions by the joint portion is cancelled, a pair of valve bodies sandwiching the opening, a pressure regulating valve, and a stress relaxation portion. Before the upstream inflation portion restrains an occupant, the pressure regulating valve is closed by the valve bodies being pushed against each other in the upstream inflation portion by the inflation gas. When the upstream inflation portion restrains the occupant, external force generated by the restraint flexes the valve bodies via the partitioning member and separates the valve bodies from each other, so that the pressure regulating valve is opened. The stress relaxation portion is arranged in the overlapping portions. When the pressure regulating valve is opened, the stress relaxation portion relaxes stress acting on part of the joint portion that is adjacent to the opening.

With the above-mentioned structure, before the upstream inflation portion restrains the occupant, the valve bodies are pushed against each other by the inflation gas in the upstream inflation portion, and the pressure regulating valve is closed. This restricts the flow of the inflation gas in the opening. The inflation gas in the upstream inflation portion does not flow, or if any, slightly flows to the downstream inflation portion via the opening. Thus, the internal pressure of only the upstream inflation portion in the inflation portion of the airbag is increased, and the upstream inflation portion is deployed and inflated.

When the upstream inflation portion restrains the occupant, external force applied by the restraint pushes the inflation portion to deform. Accordingly, the valve bodies of the pressure regulating valve flex via the partitioning member and separate from each other so that the pressure regulating valve is opened. The flow restriction is thus cancelled, and the inflation gas in the upstream inflation portion is permitted to flow into the downstream inflation portion via the opening. As the inflation gas flows out via the opening, the internal pressure in the upstream inflation portion is reduced. Accordingly, the internal pressure of the downstream inflation portion is increased, and the downstream inflation portion is deployed and inflated.

When the pressure regulating valve is opened, the valve bodies flex via the partitioning member and separate from each other as described above. At this time, stress is applied to the joint portion that joins the overlapping portions with each other at a boundary between the overlapping portions and the non-overlapping portions, and in particular, to part of the joint portion that is adjacent to the opening. However, in the first aspect, since the stress relaxation portion is provided at the overlapping portions, the stress relaxation portion relaxes stress acting on part of the joint portion that is adjacent to the opening. Thus, the stress associated with opening of the pressure regulating valve is not likely to concentrate at a specific part of the joint portion.

BRIEF DESCRIPTION OF THE DRAWINGS

The invention, together with objects and advantages thereof, may best be understood by reference to the following description of the presently preferred embodiments together with the accompanying drawings in which:

FIG. 7A is a partial cross-sectional side view illustrating the airbag module in which the airbag that is in the uninflated and deployed state in FIG. 4 is cut at the center portion in the vehicle widthwise direction, together with the occupant;

FIG. 7B is an enlarged partial cross-sectional side view illustrating the part denoted by U in FIG. 7A;

FIG. 8A is a front view illustrating a state where the airbag is deployed and inflated, and the partitioning member is under tension;

FIG. 8B is an enlarged partial front view illustrating the part denoted by V in FIG. 8A;

FIG. 9A is a front view illustrating the upper fabric piece in a deployed state, FIG. 9B is a front view illustrating the fabric piece of FIG. 9A in a folded state, FIG. 9C is a front view illustrating the lower fabric piece in a deployed state, FIG. 9D is a front view illustrating the fabric piece of FIG. 9C in a folded state, and FIG. 9E is a front view illustrating the fabric piece of FIG. 9D in a further folded state;

FIGS. 13A to 13C are schematic views illustrating the operation of the pressure regulating valve.

DETAILED DESCRIPTION OF THE PREFERRED EMBODIMENTS

A side airbag apparatus according to one embodiment of the present invention applied to a vehicle, which is a vehicle in this embodiment, will now be described with reference to FIGS. 1 to 13.

In the following, the direction in which a vehicle advances forward will be referred to as the front, and reverse direction will be referred to as the rear. The middle of the width direction of the vehicle is used as reference in the width direction of the vehicle. A side closer to the middle of the width direction will be referred to as "inner side" of the vehicle, while a side farther from the vehicle center will be referred to "outer side" of the vehicle.

It is provided that an average sized occupant (adult) is seated on a vehicle seat in a normal posture.

Figure 1:
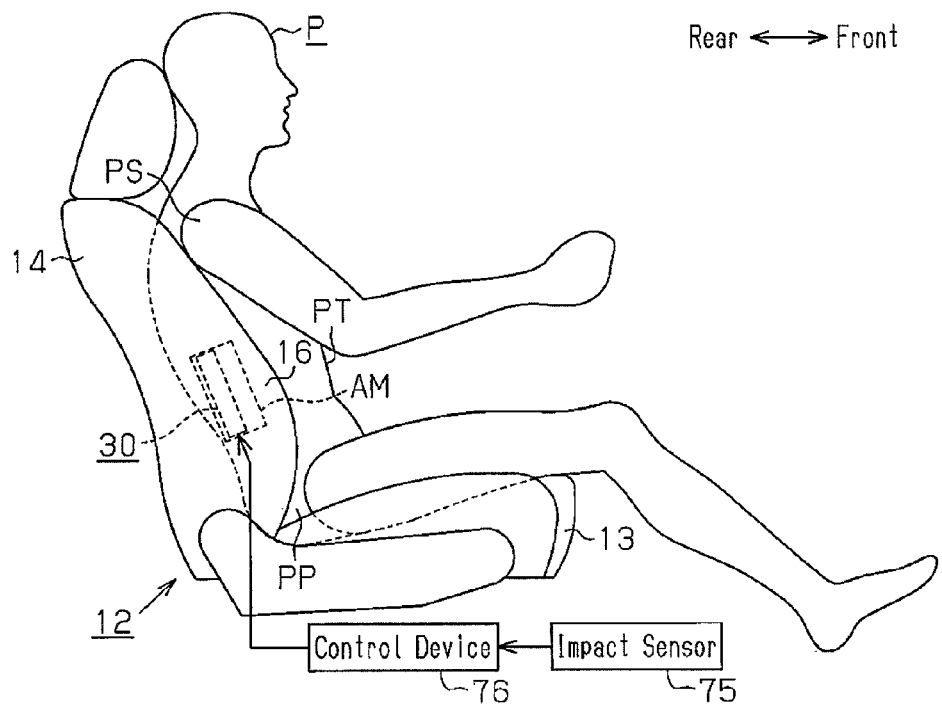
FIG. 1 is a side view illustrating, together with an occupant, a vehicle seat to which a side airbag apparatus according to one embodiment of the present invention is mounted.
Figure 2:
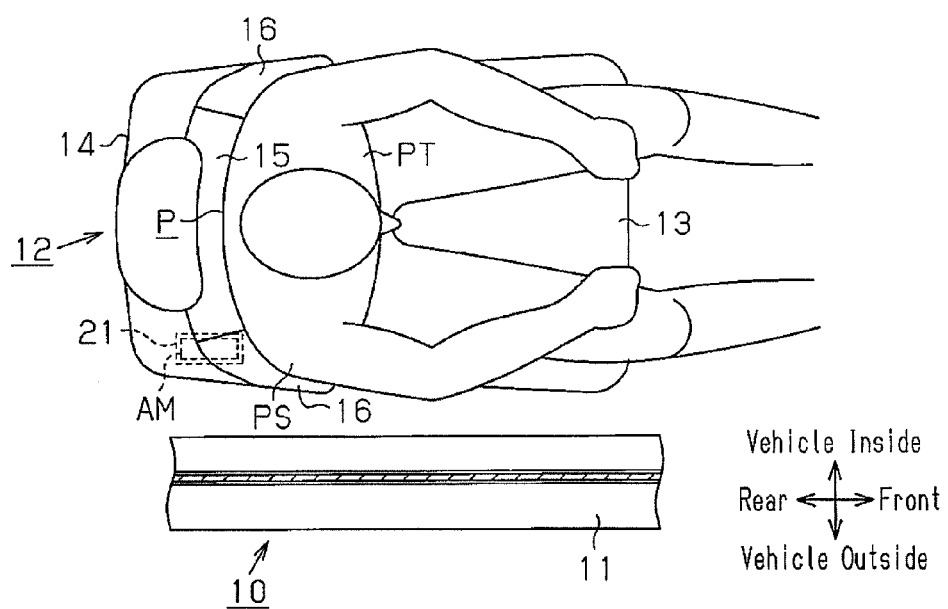
FIG. 2 is a cross-sectional plan view showing the positional relationship of the vehicle seat, the occupant, and a body side portion.

As shown in FIGS. 1 and 2, a vehicle seat 12 is arranged on the inner side (upper side as viewed in FIG. 2) of a body side portion 11 of a vehicle 10. The body side portion 11 refers to a vehicle component that is located at a side of the vehicle 10, and mainly corresponds to a door and a pillar. For example, part of the body side portion 11 corresponding to the front seat includes a front door, a center pillar (B-pillar), and the like. Part of the body side portion 11 corresponding to the rear seat includes a rear part of the side door (rear door), a C-pillar, a front part of the wheel well, a rear quarter, and the like.

The vehicle seat 12 includes a seat cushion (seat portion) 13 and a backrest 14. The backrest 14 extends upward from the rear end of the seat cushion 13 and includes a tilt adjusting mechanism (not shown) that adjusts the tilt angle of the backrest 14. The vehicle seat 12 is arranged in the vehicle 10 such that the backrest 14 faces forward of the vehicle. The width direction of the thus arranged vehicle seat 12 matches with the width direction of the vehicle.

The backrest 14 includes a backrest main body 15 and a pair of side support portions 16, which is provided on both side portions of the backrest main body 15 in the widthwise direction. The backrest main body 15 is tilted rearward, and supports the upper body of an occupant P from the rear side. The side support portions 16 protrude forward from the backrest main body 15, and restrict the widthwise movement of the upper body of the occupant P seated on the seat cushion 13 and leaned against the backrest main body 15.

The internal structure of the outer side portion of the backrest 14 including the outer side support portion 16 will now be described.

Figure 3:
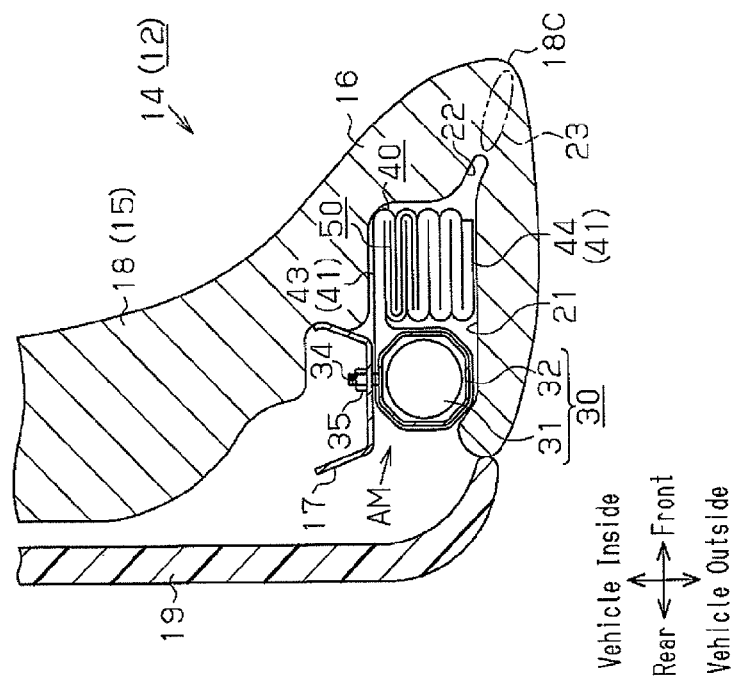
FIG. 3 is a partial cross-sectional plan view illustrating the airbag module installed in the accommodating portion of the backrest of the seat.

A seat frame, which forms a framework of the backrest 14, is arranged in the backrest 14. As shown in FIG. 3, a part of the seat frame is located in the outer part of the backrest 14 (a lower part as viewed in FIG. 3). The part of the seat frame (hereinafter referred to as a side frame portion 17) is formed by bending a metal plate. A seat pad 18, which is made of an elastic material such as urethane foam, is provided on the front side of the seat frame, which includes the side frame portion 17. Also, a hard back board 19, which is formed, for example, of plastic, is arranged on the back of the seat frame. Although the seat pad 18 is coated with a cover, the cover is not illustrated in FIG. 3. The same applies to FIG. 6, which will be discussed below.

In the seat pad 18, a storage portion 21 is provided in the vicinity of the outer side of the side frame portion 17. The storage portion 21 is located in the vicinity of and diagonally backward of the occupant P seated on the vehicle seat 12 (see FIG. 2). The storage portion 21 accommodates an airbag module AM, which forms a main part of the side airbag apparatus.

A slit 22 is formed to extend from the outer front corner of the storage portion 21. The slit 22 extends diagonally forward and toward the exterior. A part between a front corner 18C of the seat pad 18 and the slit 22 (a part surrounded by a line formed by a long dash alternating with two short dashes in FIG. 3) forms a breakable portion 23, which is designed to be broken by an airbag 40.

The airbag module AM, which is installed in the backrest 14, includes as its main components the airbag 40 and an inflator assembly 30.

Each of the components will now be described. In the present embodiment, the up-down direction and the front-rear direction of the components of the airbag module AM are defined with reference to the backrest 14 of the vehicle seat 12 as shown in FIG. 1. The direction in which the backrest 14 extends upward is defined as the up-down direction of the airbag module AM and the like, and the thickness direction of the backrest 14 is defined as the front-rear direction of the airbag module AM and the like. As described above, the backrest 14 is slightly inclined backward in normal use. Thus, in a strict sense, the up-down direction of the airbag module AM and the like does not match the up-down direction (vertical direction) of the vehicle 10, but is slightly inclined. Likewise, the front-rear direction of the airbag module AM and the like does not match the front-rear direction of the vehicle 10 (the horizontal direction), but is slightly inclined.

<Inflator Assembly 30>

As shown in FIGS. 3 and 7(A), the inflator assembly 30 includes a gas source, which is an inflator 31, and a retainer 32 mounted on the outer surface of the inflator 31. In the present embodiment, a pyrotechnic type inflator is employed as the inflator 31. The inflator 31 is substantially columnar and accommodates a gas generating agent (not shown), which generates inflation gas G. A harness (not shown), which is wiring for applying activation signals to the inflator 31, is connected to one end in the longitudinal direction (the lower end in the present embodiment) of the inflator 31.

In place of the pyrotechnic type inflator using the gas generating agent, it is possible to use, as the inflator 31, a hybrid type inflator, which jets out inflation gas by breaking a partition wall of a high-pressure gas cylinder filled with high-pressure gas with a low explosive.

The retainer 32 functions as a diffuser and also functions to fasten the inflator 31, together with the airbag 40, to the side frame portion 17. Most of the retainer 32 is formed by bending a plate such as a metal plate into a cylindrical shape. The retainer 32 has a window 33, through which a considerable amount of the inflation gas G discharged by the inflator 31 is jetted to the exterior of the retainer 32.

Bolts 34 are fixed to the retainer 32. The bolts 34 serve as securing members for attaching the retainer 32 to the side frame portion 17. In other words, the bolts 34 are indirectly fixed to the inflator 31 by means of the retainer 32.

The inflator 31 and the retainer 32 of the inflator assembly 30 may be integrated.

<Airbag 40>

Figure 11:
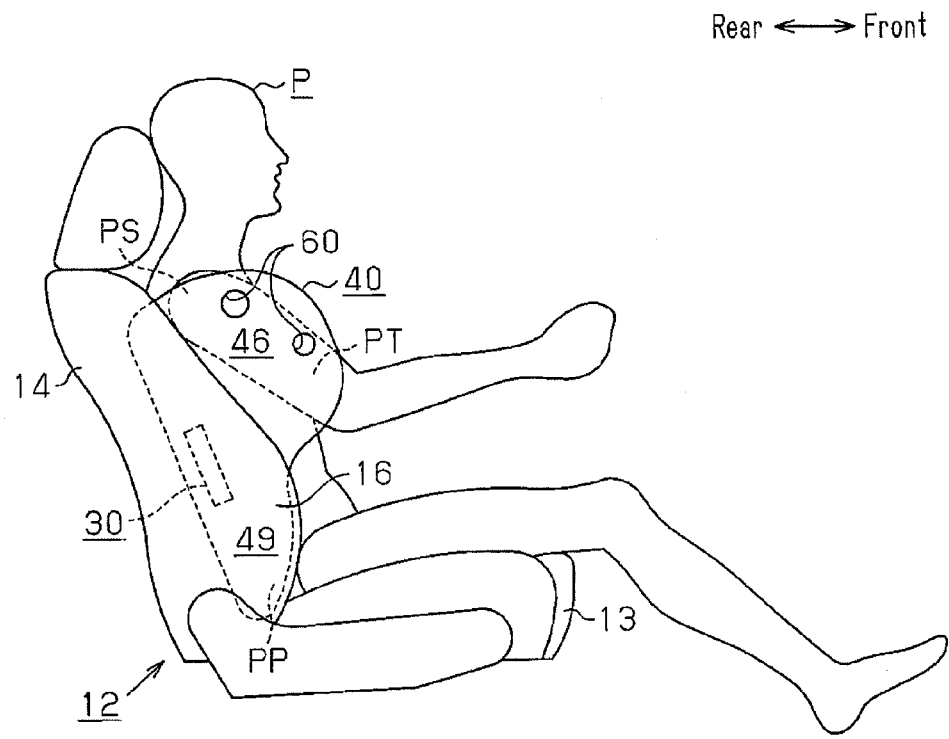
FIG. 11 is a side view illustrating a state where the upper protecting inflation portion and the lower protecting inflation portion are deployed and inflated from a non-operating state of the side airbag apparatus shown in FIG. 1.
Figure 12:
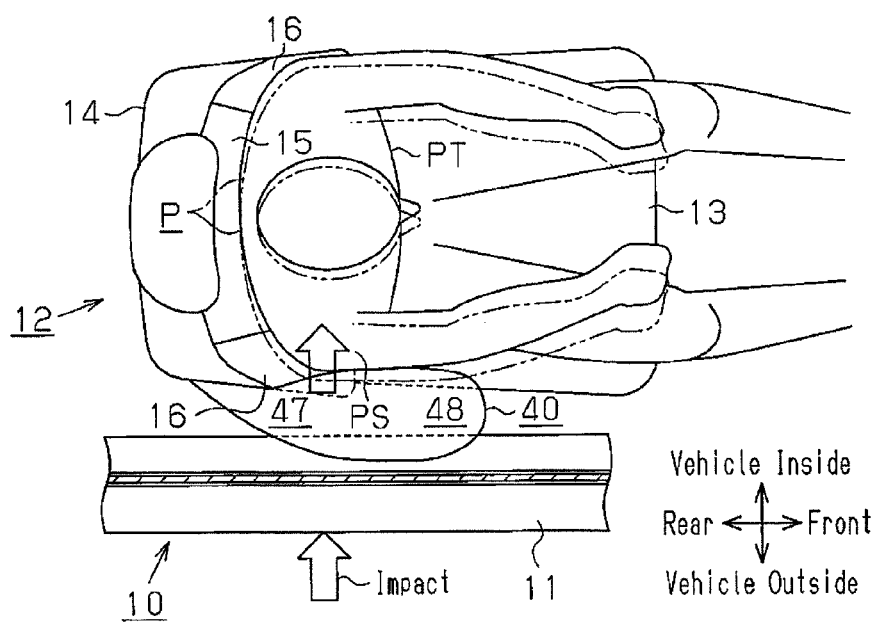
FIG. 12 is a cross-sectional plan view illustrating a state where the upstream inflation portion and the downstream inflation portion of the upper protecting inflation portion are deployed and inflated from the non-operating state of the side airbag apparatus shown in FIG. 2.
Figure 14:
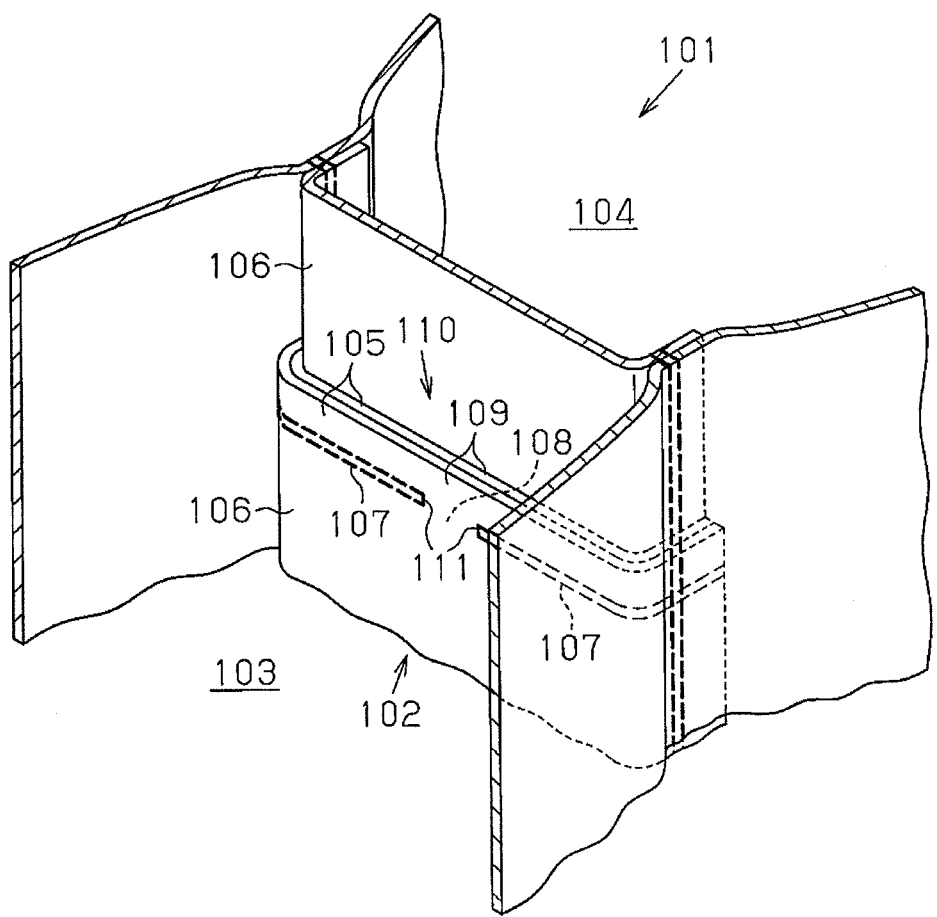
FIG. 14 is a partial perspective view illustrating a pressure regulating valve of a conventional airbag apparatus and the vicinity thereof.

As shown in FIGS. 11 and 12, when an impact is applied to the body side portion 11 of the vehicle 10 from the side of the vehicle seat 12 due to, for example, a side collision when the vehicle 10 is moving, the inflator 31 supplies inflation gas G to the airbag 40. The airbag 40 is deployed and inflated substantially forward from the backrest 14 with part of the airbag 40 remaining in the backrest 14. The airbag 40 protects most part of the upper body of the occupant P from the impact of the side collision by being deployed and inflated at a position close to the occupant P seated on the vehicle seat 12, in this case, between the upper body of the occupant P and the body side portion 11.

Figure 4:
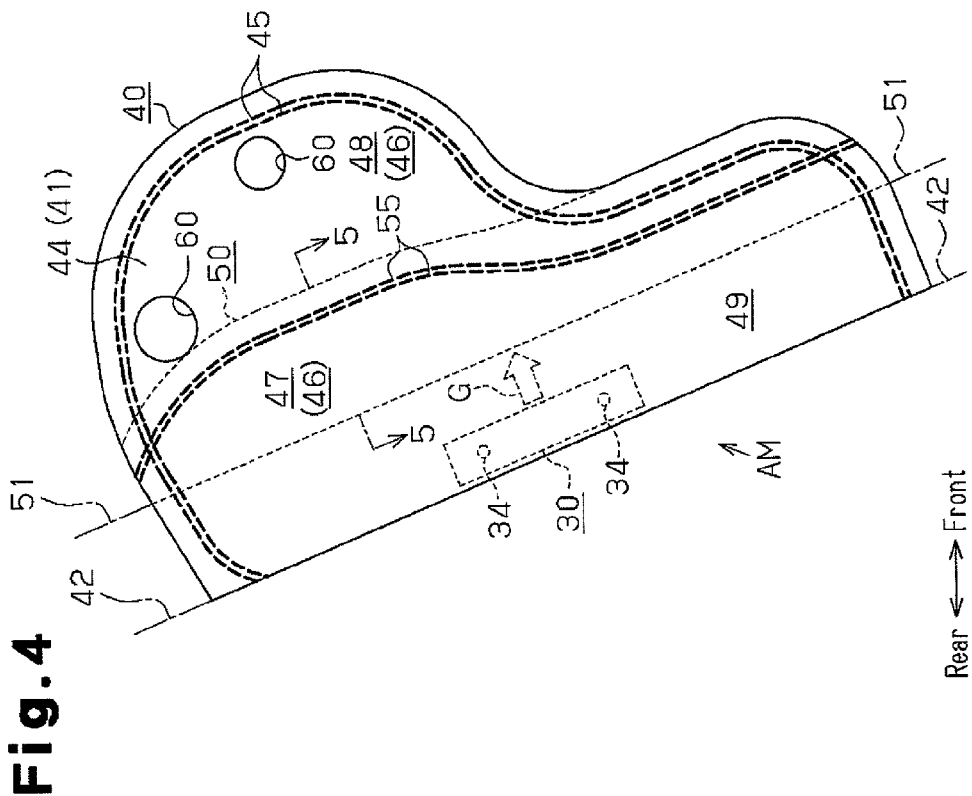
FIG. 4 is a side view illustrating the airbag module in a state where the airbag is in an uninflated and deployed state.

FIG. 4 shows the airbag module AM in the state in which the airbag 40 is deployed in a planar form without charging the inflation gas G (hereinafter, referred to as an uninflated and deployed state). FIG. 7A shows, together with the occupant P, the airbag module AM in which the airbag 40 in the uninflated and deployed state of FIG. 4 is cut at the center portion of the vehicle widthwise direction to show the internal structure of the airbag module AM.

As shown in FIGS. 4 and 7A, the airbag 40 is formed by folding a single fabric piece 41 (also referred to as a base fabric, or a fabric panel) along a folding line 42 set at the center portion to be overlapped in the vehicle widthwise direction, and joining the overlapped portion into a bag shape. In this embodiment, to distinguish the two overlapped portions of the airbag 40, the part located on the inner side is referred to as a fabric portion 43 (see FIG. 7A), and the part located on the outer side is referred to as a fabric portion 44 (see FIG. 4).

In the present embodiment, the fabric piece 41 is folded in half such that the folding line 42 is located at the rear end of the airbag 40. However, the fabric piece 41 may be folded in half such that the folding line 42 is located at other end such as the front end, the upper end, or the lower end. The airbag 40 may also be formed of two fabric pieces divided along the folding line 42. In this case, the airbag 40 is formed by overlapping the two fabric pieces in the vehicle widthwise direction, and joining the fabric pieces into a bag shape. Furthermore, the airbag 40 may be formed of three or more fabric pieces.

In the airbag 40, the outer shapes of the fabric portions 43, 44 are symmetric with respect to the folding line 42. The shape and size of the fabric portions 43, 44 are set to be able to occupy the region corresponding to most part of the upper body of the occupant P seated on the vehicle seat 12, for example, the section from a lumbar region PP to a thorax PT and a shoulder region PS when the airbag 40 is deployed and inflated between the vehicle seat 12 and the body side portion 11.

The fabric portions 43, 44 are preferably formed of a material having high strength and flexibility to be easily folded. The material may be, for example, woven cloth formed of polyester threads or polyamide threads.

The fabric portions 43, 44 are joined at peripheral joint portion 45 provided at the peripheral portions of the fabric portions 43, 44. In the present embodiment, the peripheral joint portion 45 is formed by sewing (sewn with a sewing thread) part of the peripheral portions of the fabric portions 43, 44 except the rear end (the part in the vicinity of the folding line 42). The same applies to later-described outer joint portions 54, 55, a joint portion 64, an extended joint portion 65, and a stress relaxation portion 66 in this point.

Regarding sewing, two types of lines represent sewing portions in FIGS. 4, 7A, 8A, 8B, and 10. The first type of line includes thick lines with a certain length arranged intermittently, and represents the state of the sewing thread on the outer side of the fabric portions 43, 44 (not between the fabric portions 43, 44), which are the target of sewing (see FIG. 4). The second type of line includes dots arranged at predetermined intervals, and represents the state of the sewing thread at the position between the fabric portions 43, 44, which are the target of sewing (see the peripheral joint portion 45 in FIG. 7A). That is, the drawings in which the sewing is represented by the latter manner show the structure along the cross-section that passes through the sewing portion.

As shown in FIGS. 4 and 7(A), the space between the fabric portions 43, 44 and surrounded by the peripheral joint portion 45 serves as an inflation portion. When being deployed and inflated by the inflation gas G on the side of the upper body of the occupant P, the inflation portion restrains the most part of the upper body and protects the upper body from the impact.

The peripheral joint portion 45 may be formed by method other than sewing using sewing thread, but may be formed by, for example, using an adhesive. The same applies to the later-described outer joint portions 54, 55, the joint portion 64, the extended joint portion 65, and the stress relaxation portion 66.

The inflator assembly 30 is arranged at the rear end in the airbag 40 in the posture in which the inflator assembly 30 is inclined such that the front end is lowered. The bolts 34 of the retainer 32 are inserted in the fabric portion 43 on the inner side (see FIG. 3). The insertion of the bolts 34 engages the inflator assembly 30 to the airbag 40 in a state where the position is determined with respect the airbag 40.

The inflation portion of the airbag 40 is divided into regions by a planar partitioning member 50. The partitioning member 50 has the same structure as a member generally referred to as a tether.

Figure 5:
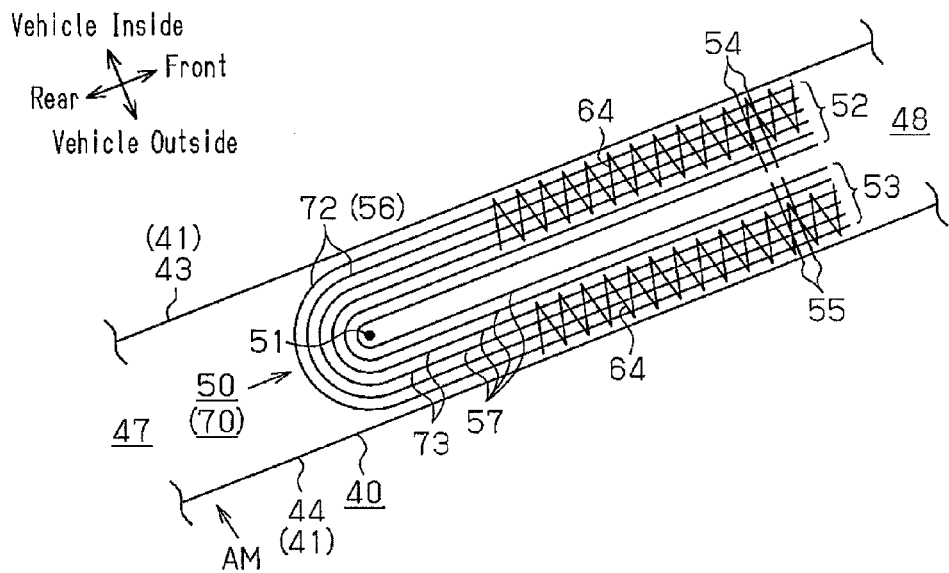
FIG. 5 is an enlarged partial cross-sectional view taken along line 5-5 of FIG. 4 schematically showing the cross-sectional structure of the partitioning member.

FIG. 5 shows a cross-sectional structure along line 5-5 of FIG. 4. In FIG. 5, the thickness of the members is omitted, and the joint portions 64 are drawn in a zigzag manner. As shown in FIGS. 5 and 7(A), when the airbag 40 is in the uninflated and deployed state, the partitioning member 50 is folded in half by folding the partitioning member 50 along the folding line 51, which extends in the up-down direction, so that opposite ends 52, 53, which face each other, are brought close to each other. The partitioning member 50, which is folded in half, is located in the inflation portion in a state where the folding line 51 is located upstream of the opposite ends 52, 53. In the present embodiment, the side closer to the inflator 31 is referred to as an upstream side, and the side farther from the inflator 31 is referred to as a downstream side.

Figure 10:
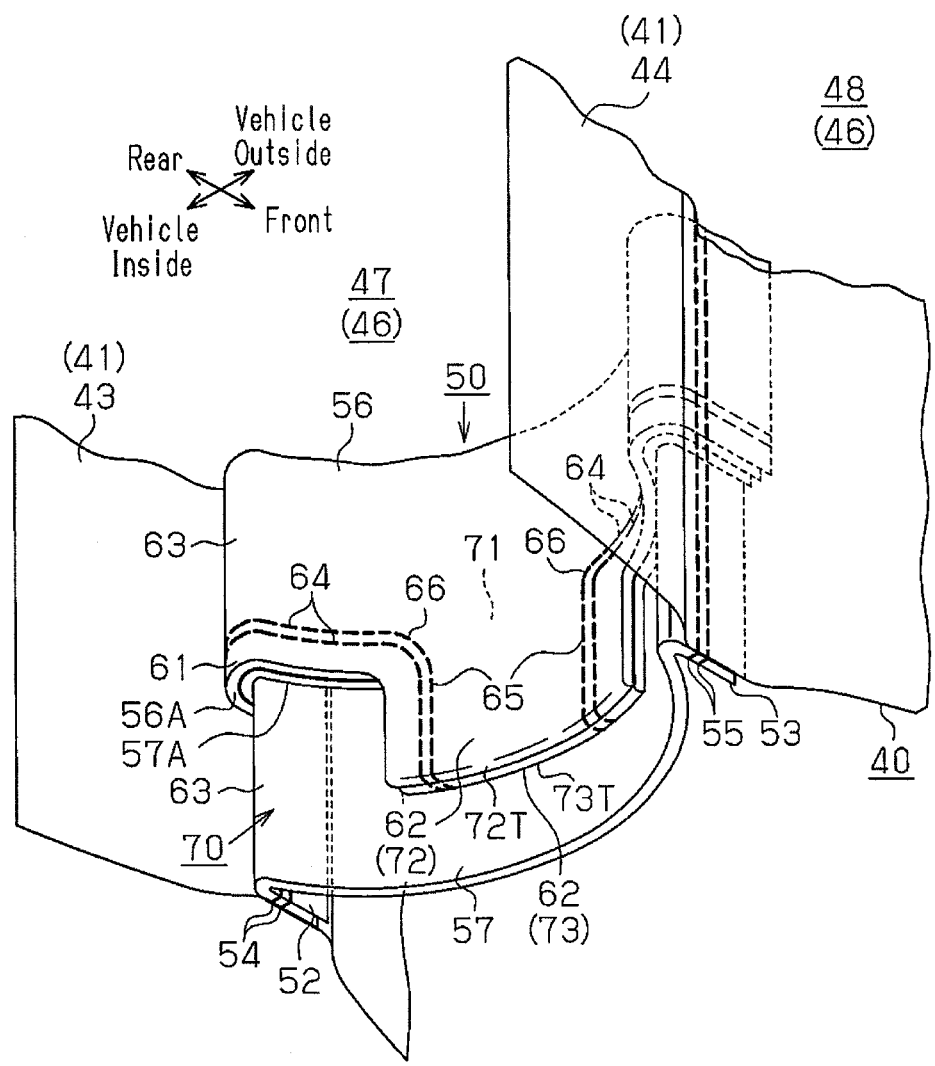
FIG. 10 is a partial perspective view illustrating part of the partitioning member in the vicinity of the pressure regulating valve as viewed from the upstream section.

As shown in FIGS. 8A and 10, when the partitioning member 50 is held under tension in a planer state as the inflation portion is deployed and inflated, the length L1 in the direction along the folding line 51 (hereinafter, referred to as the longitudinal direction) is greater than the length L2 in the direction perpendicular to the folding line 51 (hereinafter, referred to as the lateral direction). The partitioning member 50 is joined to the fabric portions 43, 44 of the airbag 40 at the opposite ends 52, 53 by the outer joint portions 54, 55, which extend in the up-down direction.

The thus joined partitioning member 50 extends between the fabric portion 43 on the inner side of the vehicle and the fabric portion 44 on the outer side of the vehicle. When the airbag 40 is in the uninflated and deployed state, the partitioning member 50 is folded in half (see FIGS. 5 and 7A). Also, when the inflation portion is deployed and inflated, the partitioning member 50 is brought under tension in the widthwise direction of the vehicle seat 12 (the vehicle widthwise direction) (see FIGS. 8A and 10), and restricts the thickness of the inflation portion in this direction.

The partitioning member 50 that is folded in half is also joined to the airbag 40 at both ends in the direction of the folding line 51. That is, the upper end and the lower end of the partitioning member 50 are joined to the upper end and the lower end of the fabric portions 43, 44 of the airbag 40 (sewn together) by the above-mentioned peripheral joint portion 45 (see FIG. 7(A)).

As shown in FIGS. 4 and 7(A), the inflation portion is mainly formed of an upper protecting inflation portion 46 and a lower protecting inflation portion 49. After being deployed and inflated in the side portion of the backrest 14, the upper protecting inflation portion 46 breaks the side portion and is projected forward. The upper protecting inflation portion 46 is then deployed and inflated on the side of the upper portion of the upper body of the occupant P.

The upper protecting inflation portion 46 is divided into an upstream inflation portion 47 and a downstream inflation portion 48 by the partitioning member 50. While the upstream inflation portion 47 is deployed and inflated on the side of the rear half of the upper portion of the upper body of the occupant P, the downstream inflation portion 48 is deployed and inflated on the side of the front half portion.

The lower protecting inflation portion 49 is provided in a state connected to the lower side of the upper protecting inflation portion 46 (mainly, the upstream inflation portion 47). A vent hole 60 for the inflation gas G is formed in the fabric portion 44 of the downstream inflation portion 48 on the outer side of the vehicle.

In the present embodiment, the partitioning member 50 is provided not only in the upper protecting inflation portion 46 but also in the lower protecting inflation portion 49. Specifically, the lower protecting inflation portion 49, the partitioning member 50 is located at a position close to the front end of the lower protecting inflation portion 49. Thus, the lower protecting inflation portion 49 is in a state that is substantially the same as when the lower protecting inflation portion 49 is not divided. In other words, the partitioning member 50 is in a state that is the same as when the partitioning member 50 is provided only in the upper protecting inflation portion 46 as shown by a broken line in which a long dash alternates with a pair of short dashes in FIG. 8A. In this case, as shown in FIG. 8A, when the longitudinal length of the partitioning member 50 in the upper protecting inflation portion 46 is represented by L1', the length L1' is shorter than the above-mentioned length L1. However, since the upper protecting inflation portion 46 inflates longitudinally, the length L1' is longer than the length L2 in the lateral direction.

As shown in FIGS. 4 and 7A, the inflator assembly 30 is arranged inside of either the upstream inflation portion 47 or the lower protecting inflation portion 49. With this configuration, the inflation gas G from the inflator 31 is first supplied to the upstream inflation portion 47 in the upper protecting inflation portion 46. The inflation gas G that has passed through the upstream inflation portion 47 is then supplied to the downstream inflation portion 48, which is located adjacent to the front side of the upstream inflation portion 47.

The partitioning member 50 is formed of two fabric pieces 56, 57 arranged in the longitudinal direction that is a direction along the folding line 51 (the up-down direction) as shown in FIGS. 8A, 8B, and FIGS. 9A to 9E. The fabric pieces 56, 57 are formed into elongated sheets that extend in the up-down direction using the same material as the fabric portions 43, 44 of the airbag 40. However, the fabric piece 56 arranged on the upper side is shorter than the fabric piece 57 arranged on the lower side in the up-down direction. Cut-out portions 56A, 57A are formed on both widthwise ends and at the vertically center portions of each of the fabric pieces 56, 57. Folding lines 58, 59, which extend in the widthwise direction and pass through the above-mentioned cut-out portions 56A, 57A, are set at the vertically center portions of the fabric pieces 56, 57. The fabric pieces 56, 57 are folded in half along the folding lines 58, 59, and are overlapped in the thickness direction (the front-rear direction of the vehicle).

Figure 9A:
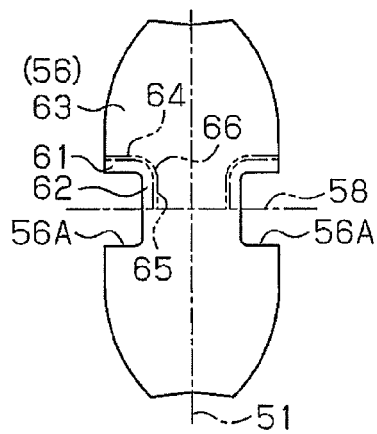
FIGS. 9A to 9E are diagrams illustrating a fabric piece forming the partitioning member, where
Figure 9B:
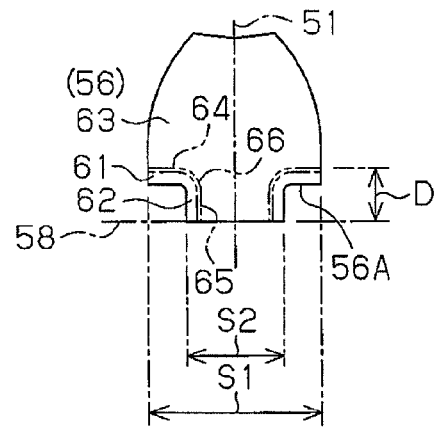
Figure 9C:
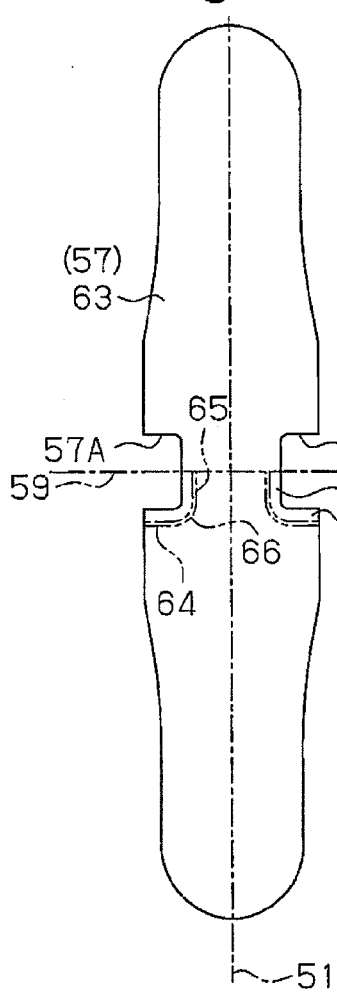
Figure 9D:
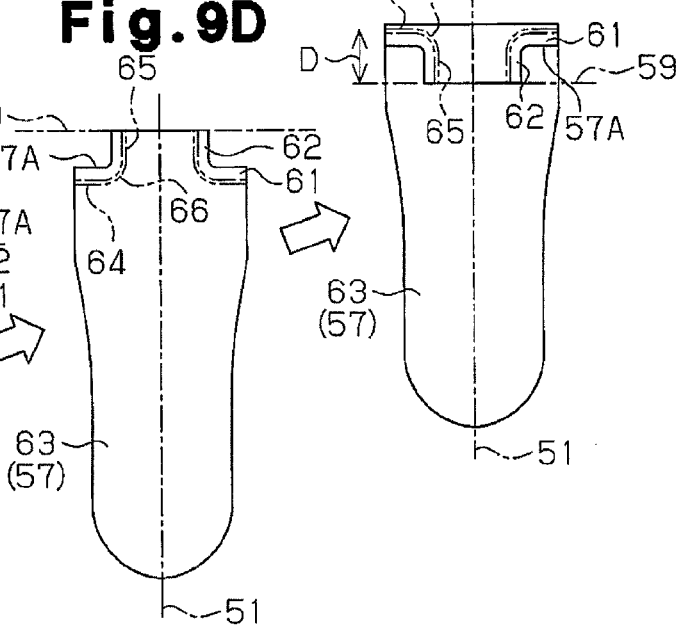
Figure 9E:
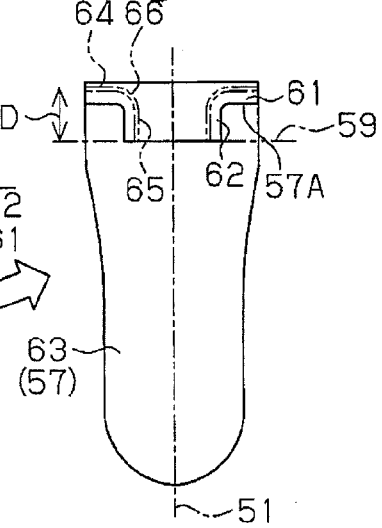

In a state where the folding lines 58, 59 are matched with each other, portions of the fabric pieces 56, 57 separated from the folding lines 58, 59 in the opposite directions from each other by a predetermined distance D are overlapped with each other (see FIGS. 8B, 9B, and 9E). These portions include a pair of overlapping portions 61, which has a certain width W1 in the direction along the folding line 51 and extend in a band-like shape along the folding lines 58, 59, and a pair of extended overlapping portions 62, which extends from the overlapping portions 61 in the opposite direction (downward in FIG. 8A) from later-described non-overlapping portions 63, and has a certain width W2 in the direction along the folding line 51. The dimension S2 of the extended overlapping portions 62 in the direction along the folding lines 58, 59 is smaller than the dimension S1 of the overlapping portions 61 in the same direction (see FIG. 9B).

Assume that portions of the fabric pieces 56, 57 that are not overlapped are referred to as a pair of non-overlapping portions 63. In this case, the overlapping portions 61 are joined by the joint portions 64, which extend in the direction along the folding lines 58, 59 (the lateral direction) at the boundary between the overlapping portions 61 and the non-overlapping portions 63.

As shown in FIGS. 8A, 8B, and 10, a pressure regulating valve 70 is provided at the longitudinally middle portion and the substantially center portion in the lateral direction of the partitioning member 50. The pressure regulating valve 70 regulates and deregulates the flow of the inflation gas G from the upstream inflation portion 47 into the downstream inflation portion 48 in accordance with the restraining state of the occupant P by the upstream inflation portion 47.

The structure of the pressure regulating valve 70 will now be described. The joint of part of the joint portion 64 (part across the folding line 51 in the present embodiment) is cancelled. In other words, the joint portion 64 that joins the upper and lower fabric pieces 56, 57 is not provided at a portion that extends across the folding line 51 in the boundary between the overlapping portions 61 and the non-overlapping portions 63.

As described above, the portion that is not provided with the joint portion 64, or the portion where the joint is cancelled forms an opening 71, which is a slit that extends in the lateral direction (the vehicle widthwise direction) and connects the upstream inflation portion 47 to the downstream inflation portion 48. The lateral direction (the vehicle widthwise direction) is the same as the direction in which the impact is applied to the vehicle 10. Also, since the opening 71 is provided, the joint portion 64 is divided into two in the lateral direction (the vehicle widthwise direction).

Parts of the overlapping portions 61 that sandwich the opening 71 from the front-rear direction, that is, parts of the overlapping portions 61 each sandwiched by the joint portions 64 form parts of valve bodies 72, 73. When the valve bodies 72, 73 contact each other at least at part of the valve bodies 72, 73, for example, at the distal end portions 72T, 73T, the pressure regulating valve 70 is closed, so that the flow of the inflation gas G via the opening 71 and between the valve bodies 72, 73 is restricted (see FIGS. 13A, 13B). Also, when the opening 71 is opened, and the valve bodies 72, 73 are pushed out from the upstream inflation portion 47 into the downstream inflation portion 48 via the opening 71, and the entire valve body 72 is separated from the entire valve body 73 in the downstream inflation portion 48, the pressure regulating valve 70 is opened. The flow restriction of the inflation gas G in the opening 71 and between the valve bodies 72, 73 is thus cancelled, and the inflation gas G is permitted to flow (see FIG. 13C).

The stress relaxation portions 66 are arranged in the overlapping portions 61. The stress relaxation portions 66 relax stress acting on parts of the joint portions 64 adjacent to the opening 71 as the pressure regulating valve 70 is opened. In the present embodiment, parts of the joint portions 64 adjacent to the opening 71 are formed to be curved at the overlapping portions 61, and more specifically, are formed to curve and bulge toward parts of the overlapping portions 61 adjacent to the non-overlapping portions 63 and toward the inside of the opening 71. The curved portions of the joint portions 64 form the stress relaxation portions 66 (see FIG. 7B).

Furthermore, the extended overlapping portions 62 are joined by the pair of extended joint portions 65. The extended joint portions 65 extend from the ends of the stress relaxation portions 66 closer to the opening 71 (inner ends) in the direction opposite to the non-overlapping portions 63 (downward in FIGS. 8A and 10) along the folding line 51.

Parts of the extended overlapping portions 62 sandwiched by the extended joint portions 65 form the valve bodies 72, 73 together with parts of the overlapping portions 61 sandwiched by the joint portions 64 (the stress relaxation portions 66). Thus, as compared to those that do not include the extended overlapping portions 62 and the extended joint portions 65, the valve bodies 72, 73 are longer in the extending direction by the amount corresponding to the extended overlapping portions 62 and the extended joint portions 65.

Before the inflation portion is deployed and inflated, the overlapping portions 61 and the extended overlapping portions 62 are folded upward or downward (downward in the present embodiment) at the boundary between the overlapping portions 61 and the non-overlapping portions 63, and are overlapped with the non-overlapping portion 63 of the lower fabric piece 57 in the upstream inflation portion 47. Furthermore, the folded band-shaped overlapping portions 61 are joined to the corresponding fabric portions 43, 44 of the airbag 40 and the non-overlapping portion 63 of the partitioning member 50 by sewing together along the joint portion 64 at the outer ends in the lateral direction, or the vehicle widthwise direction (the ends farther from the opening 71) by the above-mentioned outer joint portions 54, 55, (see FIGS. 5 and 7A).

Since the airbag 40 in the uninflated and deployed state (see FIGS. 4 and 7A) is folded as shown in FIG. 3, the airbag module AM is compact in size (hereinafter, referred to as a storage form). The airbag module AM is folded in this manner so that it is suitable for being accommodated in the storage portion 21 having a limited size in the backrest 14.

The airbag module AM in the above storage form is located in the storage portion 21 in a state where the inflator assembly 30 is located on the rear side, and most of the airbag 40 is located on the front side. As described above, the bolts 34, which extend from the retainer 32 and are inserted in the airbag 40, or more specifically, in the fabric portion 43 on the inner side, are inserted in the side frame portion 17 and fastened with nuts 35. The fastening secures the inflator assembly 30 to the side frame portion 17 together with the airbag 40.

The inflator assembly 30 may be fixed to the side frame portion 17 of the vehicle 10 using members other than the bolts 34 and the nuts 35.

As shown in FIG. 1, the side airbag apparatus includes an impact sensor 75 and a controller 76 in addition to the above-described airbag module AM. The impact sensor 75 is formed by an acceleration sensor and is provided on the body side portion 11 of the vehicle 10 (see FIG. 2) to detect an impact applied from the side on the body side portion 11. The controller 76 controls the operation of the inflator 31 based on a detection signal from the impact sensor 75.

Furthermore, the vehicle 10 is equipped with a seat belt apparatus for restraining the occupant P seated on the vehicle seat 12. However, illustration of the seat belt apparatus is omitted in FIG. 1.

The side airbag apparatus of the present embodiment is constructed as described above. The typical operation mode will now be described as operation of the side airbag apparatus. FIGS. 13A to 13C schematically show the modes of the pressure regulating valve 70 being changed over time after the inflation gas G is started to be supplied, and detailed parts are omitted or simplified.

In the side airbag apparatus, as shown in FIGS. 1 and 2, when an impact is not applied to the vehicle 10 (the body side portion 11) from the side due to a side collision, an activation signal for activating the inflator is not output from the controller 76 to the inflator 31, and the inflation gas G is not supplied to the inflation portion from the inflator 31. The airbag 40 thus remains stored in the storage portion 21 in the storage form with the inflator assembly 30 (see FIG. 3). At this time, in the airbag 40, the fabric portions 43, 44 are close to each other. As shown in FIG. 5, the partitioning member 50 is folded in half with the folding line 51 located upstream of the opposite ends 52, 53. The valve bodies 72, 73 overlap each other in the upstream inflation portion 47.

In contrast, when the impact sensor 75 detects that an impact of a magnitude greater than or equal to a predetermined value has been applied to the vehicle 10 (the body side portion 11) due to a side collision while the vehicle 10 is running, the controller 76, based on the detection signal, sends an activation signal to the inflator 31 to activate the inflator 31. In response to the activation signal, the gas generating agent in the inflator 31 generates high-temperature and high-pressure inflation gas G. The inflation gas G is first supplied to the upstream inflation portion 47 of the upper protecting inflation portion 46 and the lower protecting inflation portion 49 in the inflation portion. The upstream inflation portion 47 and the lower protecting inflation portion 49 thus start to be inflated.

The partitioning member 50 that is folded in half is located in the inflation portion in a state where the folding line 51 is located upstream of the opposite ends 52, 53. Furthermore, the partitioning member 50 is joined to the corresponding fabric portions 43, 44 of the airbag 40 at the opposite ends 52, 53 by the outer joint portions 54, 55 (see FIG. 5). Also, the partitioning member 50 is joined to the fabric portions 43, 44 by the peripheral joint portion 45 at both ends (the upper end and the lower end) of the partitioning member 50 in the direction along the folding line 51 (see FIG. 7A). Thus, when the upstream inflation portion 47 starts to be deployed and inflated as described above, the partitioning member 50 that is folded in half is pulled and form a curved surface. Tension is then applied to the partitioning member 50 on the curved surface in the longitudinal direction (the up-down direction) and the lateral direction (the vehicle widthwise direction) so that the partitioning member 50 is brought under tension (see FIGS. 8A and 10).

The internal pressure PI is applied to the valve bodies 72, 73 located in the upstream inflation portion 47 from the overlapping direction (the thickness direction) (see FIG. 13A). The internal pressure PI is not as high as when the upstream inflation portion 47 restrains the occupant P. The valve bodies 72, 73 are brought in close contact with each other by the internal pressure PI, and are in a self-sealing state, which restricts the flow of the inflation gas G between the valve bodies 72, 73. Furthermore, the overlapping portions 61, which is folded and overlapped with the non-overlapping portion 63 at the lower section of the partitioning member 50, is pressed against the non-overlapping portion 63 by the internal pressure PI (see FIG. 10). Accordingly, the valve bodies 72, 73 are further easily closed.

As shown in FIG. 8A, the partitioning member 50 is formed to be longer in the longitudinal direction (the up-down direction) than the lateral direction (the vehicle widthwise direction) (L1>L1'>L2). That is, the portion of the partitioning member 50 located in only the upper protecting inflation portion 46 is formed to be longer in the longitudinal direction (the up-down direction) than the lateral direction (the vehicle widthwise direction) as well as the portion located in the inflation portion (the entire partitioning member 50). Thus, in the partitioning member 50, stronger tension tends to be applied to the lateral direction (the vehicle widthwise direction) than the longitudinal direction (the up-down direction). In the present embodiment, since the opening 71 extends in the lateral direction (the vehicle widthwise direction) in which the strong tension tends to be applied, the opening 71 is easily closed.

Although the above-mentioned relationship exists in the intensity of the tension, the opening 71 does not always reliably close but may open since the tension is also applied in the direction to open the opening 71, that is, in the longitudinal direction (the up-down direction). However, in this case also, the valve bodies 72, 73 are at least closed at the distal end portions 72T, 73T. This is because, even if the opening 71 is pulled in the longitudinal direction (the up-down direction) as the partitioning member 50 is brought under tension so that force that acts to open the opening 71 is applied, the force is the greatest at the opening 71, is reduced as the distance from the opening 71 is increased, and is the minimum at the distal end portions 72T, 73T of the valve bodies 72, 73.

Furthermore, in the present embodiment, the overlapping portions 61 folded toward the non-overlapping portion 63 are joined to the fabric portions 43, 44 together with the opposite ends 52, 53 by the outer joint portions 54, 55 at both ends in the direction in which the slit (the joint portion 64) extends (see FIG. 10). Thus, when the upstream inflation portion 47 is deployed and inflated, strong tension is applied not only to the partitioning member 50 in the lateral direction (the vehicle widthwise direction), but also to the overlapping portions 61 in the same direction.

When the valve bodies 72, 73 at least partially contact each other, the pressure regulating valve 70 is closed. The inflation gas G in the upstream inflation portion 47 is restricted from flowing between the valve bodies 72, 73 and via the opening 71 into the downstream inflation portion 48. The above restriction hinders the flow of the inflation gas G to the opening 71. The inflation gas G in the upstream inflation portion 47 does not flow, or if any, slightly flows to the downstream inflation portion 48 through the opening 71. As a result, the inflation gas G collects at the upstream inflation portion 47, and the internal pressure of only the upstream inflation portion 47 starts to increase.

In the present embodiment, since the upper protecting inflation portion 46 is divided into the upstream inflation portion 47 and the downstream inflation portion 48 by the partitioning member 50, the volume of the upstream inflation portion 47 is smaller than the volume of the case in which the upper protecting inflation portion 46 is not divided. Thus, the internal pressure of the upstream inflation portion 47 starts to increase faster than the case in which the upper protecting inflation portion 46 is not divided, and moreover, the internal pressure of the upstream inflation portion 47 becomes higher. In particular, the inflation gas G in the upstream inflation portion 47 is permitted to flow only between the valve bodies 72, 73, and does not flow to the downstream inflation portion 48 without flowing between the valve bodies 72, 73. Thus, the increasing speed of the internal pressure in the upstream inflation portion 47 is not likely to decrease due to leakage of the inflation gas G.

Then, the inflation of the upstream inflation portion 47 causes the upstream inflation portion 47 to be unfolded in the reverse order of when it is folded. When the upstream inflation portion 47 is deployed and inflated while being unfolded, the seat pad 18 of the backrest 14 is pushed by the upstream inflation portion 47, and breaks at the breakable portion 23 (see FIG. 3).

Figure 6:
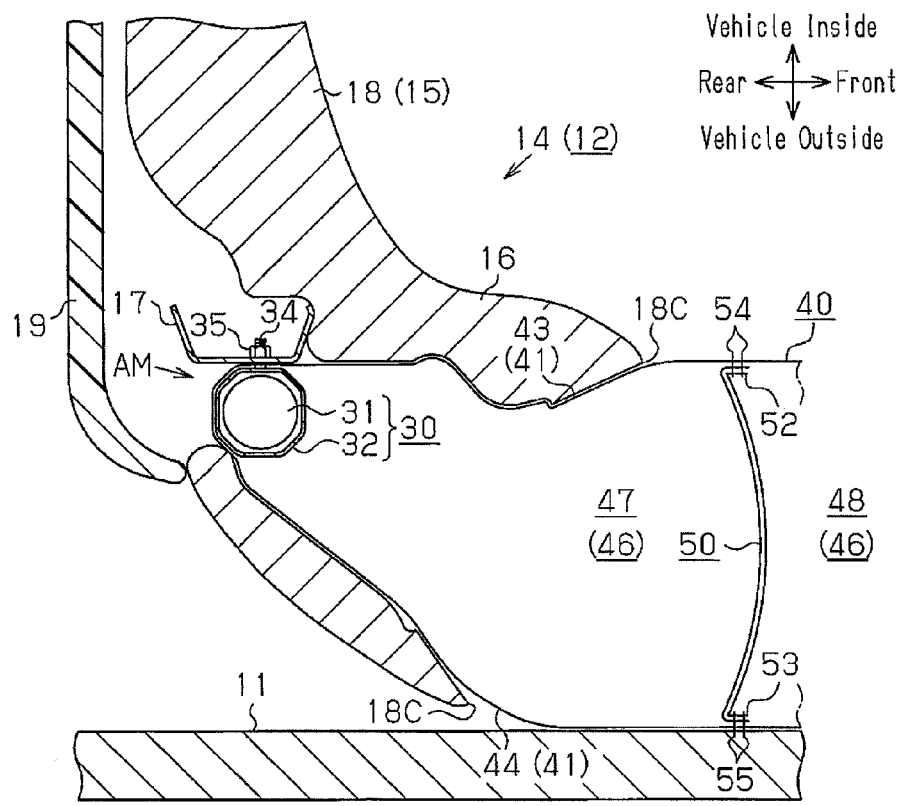
FIG. 6 is a partial cross-sectional plan view illustrating the state in which the upper protecting inflation portion has been projected from the vehicle seat to be deployed and inflated from the state of FIG. 3 with part of the upper protection and inflation portion remaining in the backrest.

Then, as shown in FIG. 6, the upstream inflation portion 47 is projected forward from the backrest 14 through the broken portion while part of the upstream inflation portion 47 is remaining in the storage portion 21.

Subsequently, the upstream inflation portion 47, which continues being supplied with the inflation gas G, is deployed while being unfolded forward between the body side portion 11 and the shoulder region PS of the occupant P as shown in FIG. 12. As shown in FIG. 7A, the upstream inflation portion 47 that has a higher internal pressure than the downstream inflation portion 48 is deployed and inflated on the side of the shoulder region PS that has a higher shock resistance than the thorax PT.

The upstream inflation portion 47 starts to be pressed against the shoulder region PS of the occupant P by the body side portion 11, which bulges inward of the vehicle. As shown by the arrow in FIG. 12, the shoulder region PS is pressed inward (away from the body side portion 11), and the upper part of the upper body of the occupant P is mainly restrained by the upstream inflation portion 47.

In contrast, the lower protecting inflation portion 49 is deployed and inflated on the side section of the backrest 14 without breaking the side support portion 16 as shown in FIG. 11. The lower protecting inflation portion 49 having high internal pressure pushes the lower part of the side portion (the side support portion 16) of the backrest 14 on the outer side of the vehicle. By pushing, the surrounding portion (the side support portion 16) of the lower protecting inflation portion 49 in the backrest 14 is inflated forward and inward of the vehicle. The inflated side support portion 16 pushes the rear portion of the lumbar region PP in the upper body of the occupant P that has the highest shock resistance diagonally forward, that is, inward of the vehicle.

As the upstream inflation portion 47 pushes the shoulder region PS, and the lower protecting inflation portion 49 pushes the lumbar region PP, the upper body of the occupant P is moved inward as shown by solid lines in FIG. 12. Also, the broken lines in which a long dash alternates with a pair of short dashes in FIG. 12 show the position of the occupant P before being moved. By this movement, the distance between the upper body of the occupant P and the body side portion 11 is increased, and the space for deploying and inflating the downstream inflation portion 48 is ensured.

Since only the upstream inflation portion 47 is deployed and inflated in the upper protecting inflation portion 46 during the above-mentioned pushing, part of the upper protecting inflation portion 46 from which the occupant P receives the pressure is only the upstream inflation portion 47.

In the state in which the valve bodies 72, 73 are closed with the entire surfaces in close contact with each other, external force is applied from the body side portion 11 while the inflation gas G is kept supplied to the upstream inflation portion 47. This causes the pressure regulating valve 70 to start to open.

That is, external force associated with the restraint of the occupant is applied from the middle of the supplying period of the inflation gas G to the upper protecting inflation portion 46, so that the upper protecting inflation portion 46 is pushed and deformed. Accordingly, the tension strongly applied to the partitioning member 50 in the lateral direction (the vehicle widthwise direction) is decreased, and the tension applied in the longitudinal direction (the up-down direction) is increased.

Also, the internal pressure of the upstream inflation portion 47 is further increased in accordance with the deformation of the upper protecting inflation portion 46, and the partitioning member 50 is pushed toward the downstream inflation portion 48 (see FIG. 13B). Thus, the tension applied to the partitioning member 50 is changed. Then, the difference between the tension acting in the longitudinal direction and the tension acting in the lateral direction is reduced as the tension is changed. As a result, the opening 71 located on the partitioning member 50 is permitted to deform, and the valve bodies 72, 73 arranged on the partitioning member 50 are permitted to operate.

The overlapping portions 61 are overlapped with the non-overlapping portion 63, and are joined to the fabric portions 43, 44 of the airbag 40 by the outer joint portions 54, 55 at the ends in the lateral direction (the vehicle widthwise direction). Therefore, the force that acts to maintain the overlapped state is strong at the parts of the overlapping portions 61 close to the outer joint portions 54, 55. However, the force is reduced as the distance from the outer joint portions 54, 55 is increased, and the force is minimized at the center in the lateral direction (the vehicle widthwise direction), that is, on the valve bodies 72, 73. Thus, the overlapping portions 61, which are pulled in the longitudinal direction (the up-down direction), are deformed in the longitudinal direction at the valve bodies 72, 73 and in the vicinity thereof.

When the opening 71 is opened by a certain amount, only the valve bodies 72, 73 of the overlapping portions 61 that have received high internal pressure PI of the upstream inflation portion 47 are pushed out into the downstream inflation portion 48 via the opening 71, and are reversed.

In the present embodiment, the extended overlapping portions 62 extend from the overlapping portions 61, and the extended joint portions 65 extend from the stress relaxation portions 66. Thus, the length of the valve bodies 72, 73 is substantially increased as compared to those without the extended portions. Thus, when the occupant is restrained by the upstream inflation portion 47, the valve bodies 72, 73 are hindered from being pushed out from the upstream inflation portion 47 into the downstream inflation portion 48 via the opening 71. Accordingly, the time at which the valve bodies 72, 73 are separated from each other in the downstream inflation portion 48, that is, the time at which the pressure regulating valve 70 is opened, is retarded as compared to the case in which the extended overlapping portions 62 and the extended joint portions 65 are not provided.

When the width W3 of the opening 71 in the up-down direction is narrow after the valve bodies 72, 73 are reversed as described above, the distal end portions 72T, 73T contact each other, and the valve bodies 72, 73 are closed at the distal end portions 72T, 73T (see FIG. 13B). This state continues during the period in which the width W3 of the opening 71 is narrower than the total value (2·W4) of the widths W4 of the valve bodies 72, 73 (see FIG. 13C).

When the width W3 of the opening 71 becomes greater than the total value (2·W4), the distal end portions 72T, 73T separate from each other (see FIG. 13(C)), and the pressure regulating valve 70 is opened. When the pressure regulating valve 70 is opened and the flow restriction is cancelled, the inflation gas G in the upstream inflation portion 47 is permitted to flow through the opening 71 and between the valve bodies 72, 73 into the downstream inflation portion 48.

When the valve bodies 72, 73 are separated from each other, great stress acts on the joint portions 64 at the boundary between the overlapping portions 61 and the non-overlapping portions 63, in particular, on parts of the joint portions 64 adjacent to the opening 71. However, in the present embodiment, in which the stress relaxation portions 66 are provided in the overlapping portions 61, the stress relaxation portions 66 relax the stress acting on parts of the joint portions 64 adjacent to the opening 71. That is, the stress associated with the opening of the pressure regulating valve 70 is received by parts of the joint portions 64 adjacent to the opening 71, in this case, the parts of the joint portions 64 that are formed to curve and bulge toward parts of the overlapping portions 61 that are adjacent to the non-overlapping portions 63 and toward the inside of the opening 71. As compared to the case in which the stress is received at the ends of the joint portions 64 (Japanese Laid-Open Patent Publication No. 2012-46167 applies to this case), the curved wide parts receive the stress. Thus, the stress associated with the opening of the pressure regulating valve 70 is not likely to concentrate at specific parts of the joint portions 64.

As the inflating gas G flows out, the internal pressure of the upstream inflation portion 47 turns from increase to decrease. However, the body side portion 11 still continues to bulge inward of the vehicle, and the inflation portion is pushed against the occupant P at the upstream inflation portion 47.

Also, as the inflating gas G flows in, the internal pressure of the downstream inflation portion 48 starts to increase, and the downstream inflation portion 48 starts to be inflated. The upper protecting inflation portion 46 is then pushed against the occupant P at the downstream inflation portion 48 in addition to the upstream inflation portion 47. The occupant P is thus restrained by the upstream inflation portion 47 and the downstream inflation portion 48.

The downstream inflation portion 48 attempts to be unfolded in the reverse order of the folding order on the side of the thorax PT, which has a lower shock resistance than the shoulder region PS and the lumbar region PP, with the internal pressure lower than that in the upstream inflation portion 47. At this time, since the gap between the body side portion 11 and the occupant P is widened by the upstream inflation portion 47 and the lower protecting inflation portion 49 to ensure the space for the downstream inflation portion 48 to be deployed and inflated, the downstream inflation portion 48 is easily deployed and inflated forward in the space as compared to the case in which the gap is not widened (see FIG. 12).

The airbag 40 is thus located between the upper body of the occupant P and the body side portion 11, which bulges into the passenger compartment. The airbag 40 pushes the upper body inward of the vehicle and restrains the upper body. The side impact transmitted to the upper body through the body side portion 11 is reduced by the inflation portion and the upper body is protected.

The present embodiment described above has the following advantages.

(1) At least part of the inflation portion of the airbag 40 (the upper protecting inflation portion 46) is divided by the partitioning member 50 into the upstream inflation portion 47 and the downstream inflation portion 48. Part of the partitioning member 50 forms the pair of overlapping portions 61 overlapped with each other in a band-like shape inside the upstream inflation portion 47, and the overlapping portions 61 are joined to each other by the joint portions 64 at the boundary between the overlapping portions 61 and the non-overlapping portions 63. The partitioning member 50 includes the pressure regulating valve 70, which includes the opening 71 formed by cancelling the joint of the overlapping portions 61 by the joint portions 64, and the pair of valve bodies 72, 73, which sandwich the opening 71. The overlapping portions 61 include the stress relaxation portions 66, which relax the stress acting on the parts of the joint portions 64 adjacent to the opening 71 as the pressure regulating valve 70 is opened (FIGS. 7A, 7B).

Therefore, the stress applied in accordance with the opening of the pressure regulating valve 70 is received by the stress relaxation portions 66 so that parts of the joint portions 64 adjacent to the opening 71 are prevented from being damaged by the stress.

(2) Parts of the joint portions 64 (parts of the joint portions 64 adjacent to the opening 71) form the stress relaxation portions 66 (FIGS. 8A, 8B).

Since parts of the joint portions 64 function as the stress relaxation portions 66, it is unnecessary to provide the stress relaxation portions 66 separate from the joint portions 64.

(3) Parts of the joint portions 64 adjacent to the opening 71 are formed to be curved at the overlapping portions 61 to form the stress relaxation portions 66 (FIGS. 8A, 8B).

Therefore, although the structure is as simple as forming parts of the joint portions 64 adjacent to the opening 71 to be curved, the stress relaxation portions 66 are formed.

Also, since the stress associated with the opening of the pressure regulating valve 70 is received by the curved wide parts, the stress is prevented from concentrating at specific points of the joint portions 64.

(4) Parts of the joint portions 64 adjacent to the opening 71 are formed to curve and bulge toward parts of the overlapping portions 61 adjacent to the non-overlapping portions 63 and toward the inside of the opening 71. The curved portions form the stress relaxation portions 66 (FIGS. 8A, 8B).

In this manner, the shape of the stress relaxation portions 66 is gently changed by forming the stress relaxation portions 66 to curve and bulge. Thus, the stress relaxation portions 66 are easily formed as compared to the case in which the shape changes abruptly.

(5) The extended overlapping portions 62 extend from the overlapping portions 61 in a direction opposite to the non-overlapping portion 63, and the extended overlapping portions 62 are overlapped with each other in a band-like shape in the upstream inflation portion 47. Also, the extended joint portions 65 extend from the stress relaxation portions 66 in a direction opposite to the non-overlapping portions 63, and join the extended overlapping portions 62 (FIGS. 8A, 8B).

As described above, since the length of the valve bodies 72, 73 are substantially increased by the extended overlapping portions 62 and the extended joint portions 65, the valve bodies 72, 73 are hindered from being pushed out from the upstream inflation portion 47 into the downstream inflation portion 48 via the opening 71 (hindered from being reversed) when the upstream inflation portion 47 restrains the occupant. As a result, the time at which the valve bodies 72, 73 are separated from each other in the downstream inflation portion 48, that is, the time at which the pressure regulating valve 70 is opened is retarded than the case in which the extended overlapping portions 62 and the extended joint portions 65 are not provided.

Also, the time at which the pressure regulating valve 70 is opened can be adjusted by adjusting the length of the extended overlapping portions 62 and the extended joint portions 65 in the extending direction.

The present invention may be embodied in the following forms.

Regarding the Partitioning Member 50

In the above-described embodiment, long pieces of fabric are used as the fabric pieces 56, 57, and are folded in half along the folding lines 58, 59. However, pieces of fabric having half the size (divided at the folding lines 58, 59) may be used as the fabric pieces 56, 57.

At least one of the fabric pieces 56, 57 of the partitioning member 50 may be divided into two along the folding line 51.

The opposite ends 52, 53 of the partitioning member 50 may be joined to the fabric portions 43, 44 of the airbag 40 in the upstream inflation portion 47 or in the downstream inflation portion 48.

Also, one of the opposite ends 52, 53 may be joined in the upstream inflation portion 47, and the other may be joined in the downstream inflation portion 48.

The structure may be changed such that the partitioning member 50 is provided only in the upper protecting inflation portion 46, and not in the lower protecting inflation portion 49.

The opening 71 and the joint portions 64 do not necessarily need to be provided in the direction perpendicular to the folding line 51 of the partitioning member 50, but may be provided in the direction diagonal to the folding line 51.

The partitioning member 50 may be formed of a single member (fabric piece). In this case, the fabric piece 56 is divided along the folding line 58 and the fabric piece 57 is divided along the folding line 59. Then, one of the divided sections of the fabric piece 56 and one of the divided sections f the fabric piece 57 are connected and integrated to form the partitioning member 50.

Parts of the overlapping portions 61 that correspond to the opening 71 (parts in the vicinity of the opening 71, or more accurately, parts between the opening 71 and the folding lines 58, 59) function as the valve bodies 72, 73. Therefore, as long as at least the distal end portions 72T, 73T of the valve bodies 72, 73 are in contact with each other and are closed when the upstream inflation portion 47 is deployed and inflated (before restraining the occupant), parts of the overlapping portions 61 that do not correspond to the opening 71 (parts not in the vicinity) may be modified. For example, parts of the overlapping portions 61 that do not correspond to the opening 71 (parts not in the vicinity) may be joined partially or entirely. The joining means may be sewing or adhering. According to this modification, only parts of the overlapping portions 61 that correspond to the opening 71 operate as the valve bodies 72, 73, and parts of the overlapping portions 61 that do not correspond to the opening 71 are prevented from unnecessarily moving, for example, fluttering.

Furthermore, a notch may be formed at least at part of the portion of the overlapping portions 61 that does not correspond to the opening 71.

The folding line 51 of the partitioning member 50 that is folded in half may be slightly inclined with respect to the up-down direction of the airbag module AM.

The portion where the joint of the overlapping portions 61 by the joint portions 64 is cancelled does not necessarily have to be provided at a portion that extend across the folding line 51, but may be provided at a portion displaced away from the folding line 51 in the direction perpendicular to the folding line 51.

The portion where the joint of the overlapping portions 61 by the joint portions 64 is cancelled may be provided more than one.

The partitioning member 50 that is folded in half by being folded along the folding line 51 such that the opposite ends 52, 53, which oppose each other, are brought close to each other may be provided in the inflation portion that is in the uninflated and deployed state in the state in which the folding line 51 is located downstream of the opposite ends 52, 53.

Part of the fabric pieces 56, 57 in the vicinity of the folding lines 58, 59 may be overlapped in a band-like shape in a state where the folding lines 58, 59 are not matched with each other.

Regarding the Inflation Portion

The substantially entire airbag 40 may be formed of the inflation portion as in the above-described embodiment, but may also partially include a non-inflation portion to which the inflating gas G is not supplied and not inflated.

The inflation portion may be divided into three or more sections by the partitioning member. In this case, of the two sections provided in the inflation portion that are adjacent to each other in the flow direction of the inflating gas G with the partitioning member located in between, the section located upstream (closer to the inflator 31) is referred to as the upstream inflation portion, and the section located downstream (farther from the inflator 31) is referred to as the downstream inflation portion. The pressure regulating valve is provided on the partitioning member between the upstream inflation portion and the downstream inflation portion.

The lower protecting inflation portion 49 may be projected forward by breaking the seat pad 18 of the backrest 14.

Regarding the Inflator Assembly 30

The inflator assembly 30 may be provided outside the airbag 40. In this case, the inflator 31 and the upstream inflation portion 47 are connected by a tube, and the inflating gas G may be supplied to the upstream inflation portion 47 from the inflator 31 via the tube.

Regarding the Storage Portion 21 of the Airbag Module AM

Instead of the backrest 14 of the vehicle seat 12, the storage portion 21 may be located in the body side portion 11 to accommodate the airbag module AM.

Others

The protection target when the present invention is applied to the side airbag apparatus is not limited to the section from the lumbar region PP to the shoulder region PS. The present invention may be applied to a side airbag apparatus that protects various sections such as the thorax PT, the section from the thorax PT to the head portion, and the section from the lumbar region PP to the head portion from an impact such as a side collision.

The present invention may be applied to a vehicle seat 12 that faces in a direction other than the forward direction, for example, in a vehicle seat 12 that faces sideways. In this case, when an impact is applied to a side of the vehicle seat 12 (in the front-rear direction of the vehicle); the side airbag apparatus protects an occupant P from the impact.

The present invention may be applied to an airbag apparatus that is different from the side airbag apparatus such as a knee protecting airbag apparatus.

Motor vehicles to which the side airbag apparatus according to the present invention is applied include various industrial vehicles in addition to private automobiles.

The present invention may be applied not only to the airbag apparatus installed in a seat of motor vehicles, but also to airbag apparatuses installed in a seat of other vehicles such as aircrafts and ships.

The invention claimed is:

1. An airbag apparatus comprising:
   an airbag having an inflation portion that is deployed and inflated by inflation gas supplied in response to an impact to a vehicle; and
   a partitioning member arranged in the inflation portion, wherein the partitioning member divides at least part of the inflation portion into an upstream inflation portion, to which the inflation gas is supplied, and a downstream inflation portion, to which the inflation gas is supplied via the upstream inflation portion, wherein
   the partitioning member includes a pair of overlapping portions and a pair of non-overlapping portion each being continuous with one of the overlapping portions, wherein, in the upstream inflation portion, the overlapping portions are overlapped with each other in a band-like shape and joined to each other by a joint portion located at the boundary between the overlapping portions and the non-overlapping portions,
   the partitioning member further includes
   an opening that is formed at a portion of the overlapping portions where the overlapping portions are not joined to each other by the joint portion,
   a pair of valve bodies sandwiching the opening, and
   a pressure regulating valve, wherein, before the upstream inflation portion restrains an occupant, the pressure regulating valve is closed by the valve bodies being pushed against each other in the upstream inflation portion by the inflation gas, and wherein, when the upstream inflation portion restrains the occupant, external force generated by the restraint flexes the valve bodies via the partitioning member and separates the valve bodies from each other, so that the pressure regulating valve is opened, and
   a stress relaxation portion arranged in the overlapping portions, wherein, when the pressure regulating valve is opened, the stress relaxation portion relaxes stress acting on part of the joint portion that is adjacent to the opening.

2. The airbag apparatus according to claim 1, wherein the stress relaxation portion is provided as a part of the joint portion.

3. The airbag apparatus according to claim 2, wherein the part of the joint portion that is adjacent to the opening is formed to be curved at the overlapping portions to form the stress relaxation portion.

4. The airbag apparatus according to claim 3, wherein the part of the joint portion that is adjacent to the opening is formed to curve and bulge toward parts of the overlapping portions that are adjacent to the non-overlapping portions and toward the inside of the opening, so as to form the stress relaxation portion.

5. The airbag apparatus according to claim 4, wherein, when the upstream inflation portion restrains the occupant, the valve bodies are pushed out from the upstream inflation portion and into the downstream inflation portion via the opening and are separated from each other in the downstream inflation portion to be opened.

6. The airbag apparatus according to claim 3, wherein, when the upstream inflation portion restrains the occupant, the valve bodies are pushed out from the upstream inflation portion and into the downstream inflation portion via the opening and are separated from each other in the downstream inflation portion to be opened.

7. The airbag apparatus according to claim 2, wherein, when the upstream inflation portion restrains the occupant, the valve bodies are pushed out from the upstream inflation portion and into the downstream inflation portion via the opening and are separated from each other in the downstream inflation portion to be opened.

8. The airbag apparatus according to claim 7, further comprising:
   a pair of extended overlapping portions, each of which is extended from one of the overlapping portions in a direction opposite to the non-overlapping portions, wherein the extended overlapping portions are overlapped with each other in a band-like shape in the upstream inflation portion; and
   an extended joint portion, which is extended from the stress relaxation portion in a direction opposite to the non-overlapping portions and joins the extended overlapping portions to each other.

* * * * *